United States Patent
Waggoner et al.

(10) Patent No.: US 7,014,791 B2
(45) Date of Patent: Mar. 21, 2006

(54) LIQUID CRYSTALLINE POLYMER COMPOSITION

(75) Inventors: Marion G. Waggoner, Landenberg, PA (US); Michael Robert Samuels, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/726,227

(22) Filed: Dec. 2, 2003

(65) Prior Publication Data

US 2004/0140450 A1   Jul. 22, 2004

Related U.S. Application Data

(60) Provisional application No. 60/434,263, filed on Dec. 18, 2002.

(51) Int. Cl.
  C09K 19/52 (2006.01)
  B32B 27/08 (2006.01)
  C08G 63/60 (2006.01)
  C08G 63/02 (2006.01)

(52) U.S. Cl. .................. 252/299.01; 428/480; 528/176; 528/193; 528/194; 528/206; 528/302; 528/308; 528/308.6; 252/299.62; 252/299.67

(58) Field of Classification Search ........... 252/299.01, 252/299.62, 299.66, 299.67; 528/193, 176, 528/194, 302, 308, 308.6; 428/480
See application file for complete search history.

(56) References Cited

U.S. PATENT DOCUMENTS

| | | | |
|---|---|---|---|
| 3,637,595 A | | 1/1972 | Cottis et al. |
| 4,849,499 A | | 7/1989 | Fagerburg et al. |
| 5,173,562 A | | 12/1992 | Wilson et al. |
| 5,250,654 A | * | 10/1993 | Alms et al. .................. 528/193 |
| 5,663,276 A | * | 9/1997 | Yoneta et al. ................ 528/194 |
| 5,710,237 A | | 1/1998 | Waggoner et al. |
| 6,268,419 B1 | * | 7/2001 | Murouchi et al. .......... 524/128 |
| 6,296,950 B1 | * | 10/2001 | Murouchi et al. .......... 428/626 |
| 2004/0135118 A1 | * | 7/2004 | Waggoner .............. 252/299.01 |

FOREIGN PATENT DOCUMENTS

| | | |
|---|---|---|
| EP | 366 392 | 4/1990 |
| EP | 410 222 | 1/1991 |
| EP | 490 346 | 6/1992 |
| JP | 1-294732 | * 11/1989 |
| JP | 2003313402 | * 6/2003 |
| JP | 2003313403 | * 6/2003 |

OTHER PUBLICATIONS

English translation by computer for JP-2003313402,http://www4.ipdl.ncipi.go.jp/Tokujitu/PAJdetail.ipdl?N0000=60&NO120=01&N2001=2&N3001=2003-313402.*

English translation by computer for JP-2003313403,http://www4.ipdl.ncipi.go.jp/Tokujitu/PAJdetail.ipdl?N0000=60&NO120=01&N2001=2&N3001=2003-313403.*

Patent Abstracts of Japan, Publicaiton No. 01294732, Applicaiton No. 63123496, Application Date: May 20, 1988, "Aromatic Polyester and its Production".

Patent Abstracts of Japan, Publication No. 08041187, Application No. 06199019, Application Date: Aug. 1, 1994, "Wholly Aromatic Polyester and its Compositions".

Journal of Polymer Science, Polymer Chemistry Edition, 32 (1994)_, No. 4,., "Fully Aromatic Liquid Crystalline Homopolyesters . . . ", Bhowmik et al.

Derwent Abstract, JP 07 047624 A, Reinforcement of Side and Face of Estra-Light . . . Decorative Sheet, Okura Ind. Co., Ltd.

Derwent Abstract, JP 08041187 A, "Wholly Aromatic Polyester Used for Moulding . . . Elasticity", Nippon Petrochemicals Co., Ltd.

* cited by examiner

*Primary Examiner*—Shean C. Wu

(57) ABSTRACT

Liquid crystalline polymer having repeat units derived from 4,4'-biphenol, terephthalic acid, 2,6-naphthalenedicarboxylic acid, and 4-hydroxybenzoic acid in a limited compositional range have melting points of 400° C. or more, and are useful for molded articles and for films, particularly for uses where good high temperature resistance is needed.

8 Claims, No Drawings

LIQUID CRYSTALLINE POLYMER COMPOSITION

CROSS REFERENCE TO RELATED APPLICATION

This application claims the benefit of U.S. Provisional Application No. 60/434,263, filed Dec. 18, 2002.

FIELD OF THE INVENTION

A liquid crystalline polymer having repeat units derived from 4,4'-biphenol, terephthalic acid, 2,6-naphthalenedicarboxylic acid, and 4-hydroxybenzoic acid in a selected limited compositional range has excellent high temperature properties.

TECHNICAL BACKGROUND

Liquid crystalline polymers (LCPs) are commercially sold for a variety of uses, and in many cases they have (combinations of) properties that can't be matched by other polymers. Many LCPs have good high temperature properties that are useful, for example from about 250° C. to about 320° C. There are other LCPs that have been claimed to be useful at higher temperatures, but these have often had other drawbacks, such as poor processability and/or poor thermal stability at their melt processing and/or use temperatures. There fore LCPs with improved high temperature properties are of interest. Described herein are such LCPs, which contain repeat units derived from 4,4'-biphenol, terephthalic acid, 2,6-naphthalenedicarboxylic acid, and 4-hydroxybenzoic acid in a selected limited compositional range.

U.S. Pat. No. 4,849,499 describes copolymers containing the repeat units described above. None of the polymers actually made are reported to have melting points above 400° C., and the compositional ranges described herein are not mentioned.

Japanese Patent 7-47624B2 describes polymers with the repeat units derived from 4,4'-biphenol, terephthalic acid, 2,6-naphthalenedicarboxylic acid, and 4-hydroxybenzoic acid. Although the compositional range described in this patent overlaps with the compositional range of this invention, no examples within the range of this invention are reported, and all polymers actually made have a "flow initiation temperature" below 320° C., and are reported to be liquids at 320° C.

Working Example 1 of Japanese Patent Application 8-41187 reports the preparation of an LCP derived from 4,4'-biphenol, terephthalic acid, 2,6-naphthalenedicarboxylic acid, and 4-hydroxybenzoic acid and having a melting point of 387° C. The compositional range of this LCP is outside the compositional range claimed herein.

SUMMARY OF THE INVENTION

This invention concerns a composition, comprising, a liquid crystalline polymer consisting essentially of repeat units of the formula

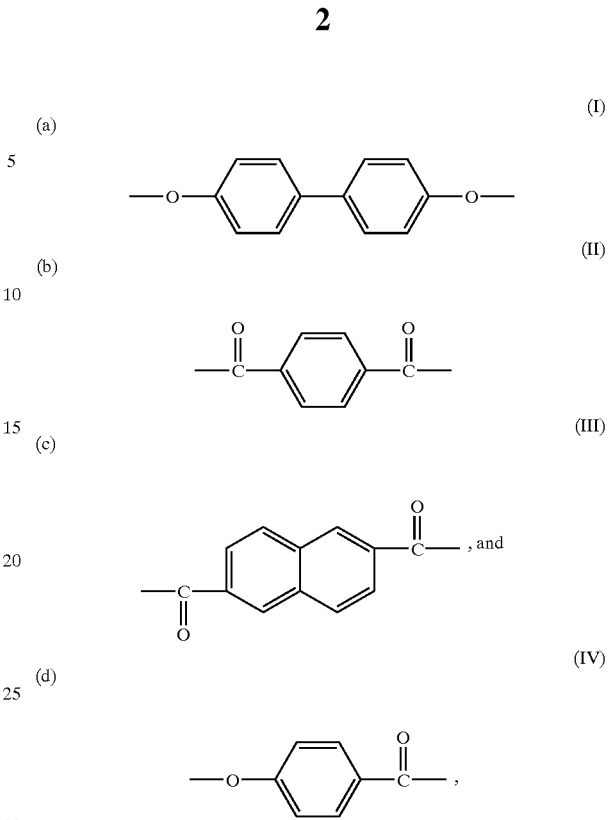

wherein per 100 molar parts of (I), (II) is 85–98 molar parts, (III) is 2–15 molar parts, and (V) is 100 to 210 molar parts, provided that:
the molar ratio of (I)/(II)+(III) is about 0.90 to about 1.10;
when (IV) is 175 or more molar parts, (III) is about 2 to 10 molar parts; and
a melting point of said liquid crystalline polymer is 400° C. or more.

DETAILS OF THE INVENTION

In these polymers (I) is derived from 4,4'-biphenol, (II) is derived from terephthalic acid, (III) is derived from 2,6-napthtalenedicarboxylic acid, (IV) is derived from 4-hydroxybenzoic acid, or one or more of their respective reactive derivatives.

In a preferred LCP, (III) is about 3 to about 10 molar parts and more preferably to about 8 molar parts, and/or (II) is about 90 to about 97 molar parts and more preferably about 93 to about 97 molar parts, and/or (IV) is about 100 to about 200 molar parts, more preferably about 100 to about 175 molar parts, and most preferably about 100 to about 160 molar parts. Also, preferably the molar ratio of (I)/(II)+(III) is about 0.95 to about 1.05 and more preferably about 98 to about 1.02. Any of these preferred compositional ranges may be combined with any of the other preferred compositional ranges.

The LCP preferably has a melting point of about 410° C. or more. The melting point is taken as the peak of the melting endotherm on the second heat when measured by Differential Scanning Calorimetry according to ASTM Method D3418-82, using a heating rate of 25° C./min. By "second heat" is meant the LCP is heated from room temperature at 25° C./min to above the melting point, cooled at 25° C./min to about 200° C., then heated again at 25° C./min to above the melting point. The melting point of the second heat is taken during the second melting of the LCP.

The LCPs can be made by any conventional method of making aromatic polyester LCPs. A typical process for producing such LCPs involves mixing 4,4'-biphenol, terephthalic acid, 2,6-naphthalenedicarboxylic acid, and 4-hydroxybenzoic acid with enough of a carboxylic acid anhydride such as acetic anhydride to acylate the hydroxyl groups of the 4,4'-biphenol and 4-hydroxybenzoic acid, and then heating the resulting mixture to remove byproduct carboxylic acid. Alternatively, the desired ester may be formed beforehand and added to the polymerization vessel, and the polymerization run without addition of carboxylic acid anhydride. The polymerizing mixture is eventually heated to a relatively high temperature, typically in the latter stages under vacuum, to produce the final LCP. This is done while the process mixture is a liquid (in the melt). However if, as in the present case, the melting point of the final desired LCP is very high, it may be difficult to heat the mixture to such a high temperature (above the melting point). In such a situation, before the LCP is fully formed (the molecular weight has reached the desired level) the liquid is cooled and solidified, and broken into small particles. These particles are then heated while in the "solid state" under stream of inert gas such as nitrogen or under a vacuum to raise the molecular weight to the desired level. This latter part of the process is commonly known as solid state polymerization (SSP), see for instance F. Pilati in G. Allen, et al., Ed., Comprehensive Polymer Science, Vol. 5, Pergamon Press, Oxford, 1989, Chapter 13, which is hereby included by reference. For the polymers of the present invention, SSP is a preferred way of raising the molecular weight to the desired level. Also preferably at least part of the SSP process is carried out at a temperature of about 300° C. or more and more preferably about 320° C. or more.

It is preferred that the LCP compositions of the present invention also comprise 5 to 1000 ppm of an alkali metal cation (as alkali metal cation, not the total of the compound which the alkali metal cation is a part of), particularly when the LCP is prepared using SSP (solid state polymerization). The presence of alkali metal cation often raises the melting point of the LCP formed and/or (when SSP is used in the polymerization process) the color of the resulting LCP is lighter. Not included within this 5 to 1000 ppm of alkali metal cation are alkali metal cations which are part of fillers or other similar materials, such as glass or mineral fillers, if they are present during the SSP. Typically the alkali metal cation will be added as a monomeric compound to the polymerization. It may be the alkali metal salt of a carboxyl containing monomer, such as disodium terephthalate or potassium 4-hydroxybenzoate. A preferred method of adding the alkali metal cation is as an alkali metal salt of 4-hydroxybenzoic acid, particularly potassium 4-hydroxybenzoate. If a hydroxycarboxylic acid is one of the monomers, an alkali metal salt of that compound is a preferred way of adding the alkali metal cation. Other alkali metal salts may be used, such as lithium acetate. While inorganic salts may be used, they may not be as effective as organic salts such as alkali metal carboxylates.

Preferably the alkali metal cation is lithium, sodium or potassium, more preferably potassium cation. The amount of alkali metal cation is based on the amount of alkali metal cation itself, not the compound in which it is added. The amount of alkali metal cation in ppm is based on the total amount of LCP in the process. At least 5 ppm, preferably 10 ppm of the alkali metal cation is present. The maximum amount of alkali metal cation is about 1000 ppm, preferably about 100 ppm, and most preferably about 40 ppm. Any maximum and minimum preferred amounts of alkali metal cation above can be combined to form a preferred range of alkali metal cation.

The LCPs of this invention have melting points of about 400° C. or more, making them useful in applications where good thermal resistance to relatively high temperatures are needed. The LCPs are useful as molding resins and for films, and can be melt formed into shaped parts (a part with one or more regular or planned dimensions and/or shapes) in typical melt forming processes such as injection molding, extrusion, and thermoforming.

In the Examples the following abbreviations are used:

AA—acetic anhydride
BP—4,4'-biphenol
HBA—4-hydroxybenzoic acid
KHBA—potassium 4-hydroxybenzoate
N—2,6-naphthtalene dicarboxylic acid
T—terephthalic acid
Tm—polymer melting point

EXAMPLES 1–4

Monomers and acetic anhydride in the molar proportions are indicated in Table 1, and the amounts by weight used are shown in Table 2. For Examples 1–3, monomers were weighed out into a 3 L resin kettle fitted with a ground glass top and agitator. A Vigreaux column was connected to the ground glass top and the top of the column was fitted with a reflux splitter, and condenser. After the reactants were charged, the apparatus was connected as described, a nitrogen gas flush was started, and a liquid metal bath heated to 160° C. was raised into position to heat approximately 75% of the lower portion of the kettle. At this time, the reflux splitter was adjusted so that 100% of the condensed vapors were returned to the kettle. The process was operated with agitation and 100% reflux for 30 min. Then, the splitter was partially opened until an estimated 75% of the condensed material was returned to the kettle and 25% was removed to a product receiver. Next, the temperature of the metal bath was raised from 160° C. to 330–335° C. over a period of approximately 3 h. The pressure was maintained at one atmosphere throughout. After the temperature reached 330–335° C., the pressure was maintained at one atmosphere until the stirring motor reached maximum torque. Then, the nitrogen flush was terminated, the agitator was stopped, and the kettle was opened and the product was removed from the kettle as a solid.

Following isolation of the solid materials, each of the materials was placed in trays in a circulating gas oven for solid state polymerization to final high molecular weight. Nitrogen was used as the gas in order to exclude air from the oven. The temperature of the oven was maintained as follows. Heated as rapidly as possible to 270° C., and held for 1 h. Then heated as rapidly as possible to 310° C. and held for 1 h. Finally, heated to a final temperature of 340° C. and held for 4 h, followed by cooling to room temperature.

The polymer of Example 4 was prepared in a similar manner except that the reaction vessel was a Hastelloy® metal reactor of approximately 19 L internal capacity and a column with packing of hollow glass cylinders was used instead of the Vigreaux column, and the final reactor temperature was 320° C.

The compositions of the polymers and reactants charged to the vessel are given in Tables 1 and 2 in molar parts and in grams, respectively. Melting points of the polymers are given in Table 2.

TABLE 1

| Ex. | BP | T | N | HBA | ppm K+ |
|---|---|---|---|---|---|
| 1 | 100 | 90 | 10 | 200 | 25 |
| 2 | 100 | 97 | 3 | 150 | 25 |
| 3 | 100 | 90 | 10 | 100 | 25 |
| 4 | 100 | 95 | 5 | 175 | 25 |

TABLE 2

| Ex. | BP, g | T, g | N, g | HBA, g | AA, g | KHBA, gm | Tm, °C. |
|---|---|---|---|---|---|---|---|
| 1 | 281.9 | 226.3 | 32.7 | 418.1 | 636.7 | 0.10 | 406 |
| 2 | 317.8 | 275.1 | 11.1 | 353.6 | 628.2 | 0.10 | 437 |
| 3 | 358.6 | 287.9 | 41.6 | 266.0 | 607.4 | 0.10 | 425 |
| 4 | 3196 | 2710 | 186.1 | 4150 | 6745 | 1.0 | 421 |

When an LCP of the composition of Example 2 was made without potassium cation being present the melting point was 424° C., and the color of that polymer was darker.

What is claimed is:

1. A composition, comprising, a liquid crystalline polymer consisting essentially of repeat units of the formula (a)

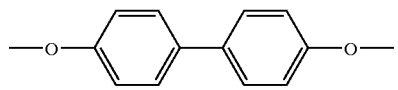
(I)

(b)

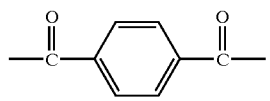
(II)

(c)

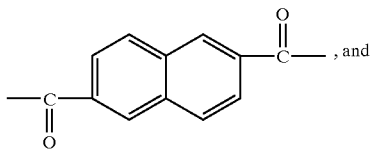
, and
(III)

(d)

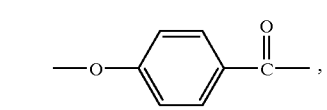
,
(IV)

wherein per 100 molar parts of (I),(II) is 85–98 molar parts, (III) is 2–15 molar parts, and (IV) is 100 to 210 molar parts, provided that:
the molar ratio of (I)/(II)+(III) is about 0.90 to about 1.10;
when (IV) is 175 or more molar parts, (III) is 2 to 10 molar parts; and
a melting point of said liquid crystalline polymer is 400° C. or more.

2. The composition as recited in claim 1 wherein 3 to about 10 molar parts of (III) are present, and 90 to 97 molar parts of (II) are present.

3. The composition as recited in claim 1 wherein about 100 to about 175 molar parts of (IV) are present.

4. The composition as recited in claim 1 wherein 3 to about 10 molar parts of (III) are present, 90 to 97 molar parts of (II) are present, and about 100 to about 175 molar parts of (IV) are present.

5. The composition as recited in claim 1 wherein said melting point is about 410° C. or more.

6. The composition as recited in claim 1 wherein said molar of (I)+(III) ratio is about 0.95 to about 1.05.

7. The composition as recited in claim 1 additionally comprising 5 to about 1000 ppm of an alkali metal cation.

8. A shaped part or film of the composition of claim 1.

* * * * *